(12) United States Patent
Goto (10) Patent No.: US 7,510,308 B2
(45) Date of Patent: Mar. 31, 2009

(54) DIFFUSING SHEET, SURFACE LIGHT SOURCE DEVICE, AND TRANSMISSION TYPE DISPLAY

(75) Inventor: Masahiro Goto, Tokyo-To (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 297 days.

(21) Appl. No.: 11/631,781

(22) PCT Filed: Jul. 11, 2005

(86) PCT No.: PCT/JP2005/012755

§ 371 (c)(1),
(2), (4) Date: Jan. 8, 2007

(87) PCT Pub. No.: WO2006/006558

PCT Pub. Date: Jan. 19, 2006

(65) Prior Publication Data

US 2008/0068716 A1    Mar. 20, 2008

(30) Foreign Application Priority Data

Jul. 12, 2004   (JP)   ............................. 2004-204114
Sep. 22, 2004   (JP)   ............................. 2004-274579

(51) Int. Cl.
*F21V 5/02*   (2006.01)
(52) U.S. Cl. ................. 362/330; 362/339; 362/331; 362/619
(58) Field of Classification Search ................. 362/355, 362/330–332, 336, 337, 339, 600, 606, 607, 362/616–620, 561, 222–225; 349/64, 65; 359/619, 599
See application file for complete search history.

(56) References Cited

U.S. PATENT DOCUMENTS 3,735,124 A * 5/1973 Stahlhut ..................... 362/333
3,794,829 A * 2/1974 Taltavull ..................... 362/330
2003/0184993 A1 10/2003 Yamada

FOREIGN PATENT DOCUMENTS

JP   U 56-99503   8/1991

(Continued)

*Primary Examiner*—Bao Q Truong
(74) *Attorney, Agent, or Firm*—Oliff & Berridge, PLC (57) ABSTRACT

The present invention provides a diffusing sheet, a surface light source device, and a transmission type display, that can attain uniform illumination so that the brightness of light on the display screen appears uniform regardless of the position from which the display screen is observed. A transmission type display 10 comprises an LCD panel 11, and a surface light source device 16 for illuminating the LCD panel 11 from its rear. The surface light source device 16 includes a plurality of cathode ray tubes 13 that are arranged in parallel. A diffusing sheet 14 and a convergent sheet 12 are placed between the cathode ray tubes 13 and the LCD panel 11 in the surface light source device 16. The diffusing sheet 14 includes, on its light-emerging side surface, a diffusion lens array 141. The diffusion lens array 141 has a plurality of unit lenses (the diffusion lens array 141 is formed by regularly arranged unit lens groups each constituted by arranging a lower unit lens 141a and a higher unit lens 141b), each unit lens being in a shape equivalent to a part of an elliptic cylinder having an elliptical section. The convergent sheet 12 has a plurality of unit lenses 121 having almost trapezoidal cross sections, formed on its surface on the cathode ray tubes 13 side. It is therefore possible to attain uniform illumination by diffusing light from the cathode ray tubes 13 in the surface light source device 16. At the same time, it is possible to converge the light serving as backlight to enhance optical efficiency.

13 Claims, 10 Drawing Sheets

FOREIGN PATENT DOCUMENTS

| | | |
|---|---|---|
| JP | A 05-1197003 | 5/1993 |
| JP | A 06-347613 | 12/1994 |
| JP | A 07-151909 | 6/1995 |
| JP | A 08-043634 | 2/1996 |
| JP | A 11-142622 | 5/1999 |
| JP | A 11-242219 | 9/1999 |
| JP | A 2001-221906 | 8/2001 |
| JP | A 2002-535690 | 10/2002 |
| JP | A 2004-191611 | 7/2004 |
| WO | WO 00/42451 A1 | 7/2000 |

* cited by examiner

DIFFUSING SHEET, SURFACE LIGHT SOURCE DEVICE, AND TRANSMISSION TYPE DISPLAY

TECHNICAL FIELD

The present invention relates to a display such as a liquid crystal display. More particularly, it pertains to a diffusing sheet for use in a surface light source device that illuminates a transmission type liquid crystal display or the like from its rear, to a surface light source device, and a transmission type display using the diffusing sheet and the surface light source device.

BACKGROUND ART

A variety of surface light source devices that are used to illuminate transmission type liquid crystal displays or the like from their rear have been proposed and put into practical use. Such surface light source devices are broadly classified into the edge light type and the direct type according to the mode of conversion of a non-surface light source to a surface light source.

Of these surface light source devices, a surface light source device of direct type is so constructed that light is introduced to the rear of a transmission type display device serving as a light valve, such as an LCD panel, directly from cathode ray tubes (arc tubes) arranged in parallel. In such a surface light source device of direct type, the cathode ray tubes and the transmission type display device are properly spaced from each other. In this space, there are placed a diffusing sheet and a combination of two or more optical sheets capable of converging light.

Such a conventional surface light source device of direct type is poor in the light-converging properties, although the number of required optical sheets is large. In order to solve this problem, the structure of the transmission type display device itself, such as an LCD panel, has been improved so that even when light is obliquely incident on the display device, an image of excellent quality can be produced. However, this conventional way of improvement suffers reduction in optical efficiency, and also suffers increase in cost because of the complicated structure of transmission type display device such as an LCD panel.

Another disadvantage of the conventional surface light source device of direct type has been that the light intensity (luminance) on the display device tends to be non-uniform depending on the distance from the cathode ray tubes (i.e., whether a certain point on the display device is close to the cathode ray tube or to the space between the cathode ray tubes that are arranged in parallel).

A possible method of avoiding the above-described non-uniformity is to place the cathode ray tubes and the transmission type display device such as an LCD panel sufficiently apart from each other. This method has been disadvantageous in that the display has an increased total thickness.

Another possible method of avoiding the above-described non-uniformity is to increase the degree to which the optical sheets or the like that are placed between the cathode ray tubes and the transmission type display device such as an LCD panel diffuse light, or to control the amount of light which the optical sheets transmit. This method has been disadvantageous in that it causes decrease in the amount of usable light.

More specifically, Japanese Patent Laid-Open Publications No. 119703/1993 and No. 242219/1999, for example, propose a method for maintaining the uniformity of light, in which a light-shielding member such as a lighting curtain or a light-shielding dot layer is provided in a surface light source device. This method has been disadvantageous in that it causes decrease in the amount of usable light, similar to the above-described method.

Further, Japanese Patent Laid-Open Publication No. 347613/1994 proposes a method in which, in a surface light source device, the diffusion of light in two directions is controlled by a sheet having lenticular lenses on both surfaces. Since the function of converging light cannot be sufficiently obtained by this method, the optical axis on every area on the face of the transmission type display device such as an LCD panel changes according to the position of the area relative to the cathode ray tubes. Thus, this method still has been disadvantageous in that the brightness of light on the display screen varies depending on the position from which the display screen is observed.

Further, Japanese Patent Publication No. 2002-535690 proposes a method of using a prism that mainly refracts and emits light that has perpendicularly entered a sheet, in combination with a prism that mainly, totally reflects light that has perpendicularly entered the sheet and then emits the light. In the method disclosed in Japanese Patent Publication No. 2002-535690, almost all the light that has perpendicularly entered the sheet is made to emerge therefrom to the light-emerging surface side, in both the case in which the light is refracted and emitted, and the case in which the light is totally reflected and then emitted. Thus, the totally reflected light, in particular, emerges from the sheet at a large angle to widely spread. Therefore, it is difficult to focus such light that emerges from the sheet at angles within a required range.

DISCLOSURE OF INVENTION

The present invention has been accomplished in the light of the above-described problems in the conventional art. An object of the present invention is therefore to provide a diffusing sheet, a surface light source device, and a transmission type display that can attain uniform illumination so that the brightness of light on the display screen appears uniform regardless of the position from which the display screen is observed.

The present invention provides, as a first means of fulfilling the above-described object of the invention, a diffusing sheet that is used in a surface light source device of direct type including a light source unit having a plurality of light sources arranged in parallel, and that diffuses light from the light sources in the light source unit to make the light uniform, the diffusing sheet comprising: at least on its light-emerging side surface, a diffusion lens array having a plurality of unit lenses that allow light from the light sources in the light source unit to be diffused and to emerge from the unit lenses, wherein the diffusion lens array includes at least two different types of a unit lens that are regularly arranged on a sheet face, each of the two types of a unit lens at least is in one shape selected from a shape equivalent to a part of an elliptic cylinder, having an elliptical section and a shape equivalent to a part of a spheroid having an elliptical section, and a major axis of the elliptical section of each of the unit lenses is perpendicular to the sheet face.

In the first means of fulfilling the object of the invention, it is preferable that the two types of a unit lens in the diffusion lens array be different from each other in height, and a unit lens group constituted by arranging the two types of a unit lens of different height be repeatedly arranged on the sheet surface.

In the first means of fulfilling the object of the invention, it is preferable that a unit lens with a higher type of the two types of a unit lens in the diffusion lens array have a height H, a width W, and a refractive index N that fulfill the relationship: arcsin $(1/N)$<arctan $(1/((2H/W)-0.1))$. It is preferable that a unit lens with a lower type of the two types of a unit lens in the diffusion lens array have a height $H_2$, a width $W_2$, and a refractive index N that fulfill the relationship: arcsin $(1/N)$<arctan $(1/((2H_2/W_2))$.

In the first means of fulfilling the object of the invention, it is preferable that a shape and a refractive index of each of the two types of a unit lens in the diffusion lens array be defined such that at least a part of light, which light has perpendicularly entered the sheet face so as to directly reach a point on a lens surface of one unit lens with a lowest type of any types of unit lenses, the light is totally reflected on the point so as to reach a next point on the lens surface, and then the light is refracted on the next point so as to emerge from the lowest unit lens, can reach another unit lens with a highest type of any types of unit lenses. It is preferable that a unit lens with a lowest type of the two types of a unit lens have a semi-major axis that is equal to or more than 2.5 times a semi-minor axis of the same. It is preferable that a unit lens with a highest type of the two types of a unit lens have a semi-major axis that is equal to or less than 2.5 times a semi-minor axis of the same.

In the first means of fulfilling the object of the invention, it is preferable that between each two adjacent unit lenses in the diffusion lens array be provided a part that is at least in one form selected from flats, concavities, and fine irregularities.

In the first means of fulfilling the object of the invention, it is preferable that the diffusing sheet include, on a light-entering side, a plane of incidence with fine irregularities having a light-diffusing action.

In the first means of fulfilling the object of the invention, it is preferable that the diffusing sheet comprise two or more layers having different rates of moisture absorption, and a layer situated on a light-entering side has a rate of moisture absorption higher than that of a layer situated on a light-emerging side on which the diffusion lens array is formed.

The present invention provides, as a second means of fulfilling the object of the invention, a light source unit having a plurality of light sources arranged in parallel; and a diffusing sheet according to any one of claims 1 to 10, that diffuses light from light sources in the light source unit to make the light uniform.

In the second means of fulfilling the object of the invention, it is preferable that the diffusing sheet be placed next to the light source unit so that light from the light source unit directly enters the diffusing sheet.

The present invention provides, as a third means of fulfilling the object of the invention, a transmission type display device; and a surface light source device according to claim 11 or 12, that illuminates the transmission type display device from its rear.

The present invention can show the following actions and effects.

(1) In the surface light source device of direct type comprising a light source unit having a plurality of light sources arranged in parallel, the diffusing sheet having, at least on its light-emerging side surface, the diffusion lens array is incorporated. Since the diffusion lens array includes at least two different types of a unit lens that are regularly arranged on a sheet face, light incident on the diffusing sheet at any angles can have a plurality of luminance features, so that the light can be diffused in various directions. As a result, the illumination non-uniformity can be effectively decreased, and the display screen can be illuminated uniformly regardless of the position from which the screen is observed. If the shape of each unit lens in the diffusion lens array is made equivalent to a part of an elliptic cylinder or spheroid whose major axis is perpendicular to the sheet face, the diffusing properties of the unit lenses can be freely controlled as compared with cylindrical or spherical unit lenses.

(2) If the two types of a unit lens in the diffusion lens array are different from each other in height, and a unit lens group constituted by arranging the two types of a unit lens of different height is repeatedly arranged on the sheet surface, it is possible both to decrease the illumination non-uniformity and to prevent light from emerging at an unnecessarily large angle, so that an optical efficiency can be enhanced.

(3) If a unit lens with a higher type of the two types of a unit lens in the diffusion lens array has a height H, a width W, and a refractive index N that fulfill the relationship: arcsin $(1/N)$<arctan $(1/((2H/W)-0.1))$, it is possible to prevent light from emerging in a direction of a large emerging angle. Thus, no illumination non-uniformity (tube non-uniformity) suggesting a position of the light source is observed even when the display screen is observed from oblique directions, and the optical efficiency becomes higher.

(4) If a unit lens with a lower type of the two types of a unit lens in the diffusion lens array has a height $H_2$, a width $W_2$, and a refractive index N that fulfill the relationship: arcsin $(1/N)$<arctan $(1/((2H_2/W_2))$, it is possible to prevent light from emerging in a direction of a large emerging angle. Thus, no illumination non-uniformity (tube non-uniformity) is observed even when the display screen is observed from oblique directions, and the optical efficiency becomes higher.

(5) If a shape and a refractive index of each of the two types of a unit lens in the diffusion lens array are defined such that at least a part of light, which light has perpendicularly entered the sheet face so as to directly reach a point on a lens surface of one unit lens with a lowest type of any types of unit lenses, the light is totally reflected on the point so as to reach a next point on the lens surface, and then the light is refracted on the next point so as to emerge from the lowest unit lens, can reach another unit lens with a highest type of any types of unit lenses, it is possible to restrain light from spreading in unnecessary directions, so as to allow light to intensively emerge from the unit lenses at angles within a required range.

(6) If a unit lens with a lowest type of the two types of a unit lens a semi-major axis that is equal to or more than 2.5 times has a semi-minor axis of the same, or a unit lens with a highest type of the two types of a unit lens has a semi-major axis that is equal to or less than 2.5 times a semi-minor axis of the same, it is possible to make light emerging from the unit lens with a lower type at a large angle enter the unit lens with a higher type adjacent to the unit lens with a lower type. Thus, it is possible to restrain light from spreading in unnecessary directions, so as to allow light to intensively emerge from the unit lenses at angles within a required range.

(7) If between each two adjacent unit lenses in the diffusion lens array is provided a part that is in one form selected from flats, concavities, and fine irregularities, the transmittance for light incident at an angle of approximately 0°, which is insufficient when a sheet surface of the diffusing sheet is covered only by the unit lenses of the diffusion lens array, is increased. At the same time, there can be obtained the effect of properly eliminating illumination non-uniformity and the effect of correcting and converging the direction in which light emerges. Further, a mold that is used for forming such a diffusing sheet is to have increased strength, so that it is possible to prevent deformation of the mold that can occur in the production of the mold.

(8) If a plane of incidence with fine irregularities that have a light-diffusing action is provided on the light-entering side of the diffusing sheet, the diffusing properties are further enhanced, and a non-directional light-diffusing action can be obtained.

(9) If the diffusing sheet comprises two or more layers having different rates of moisture absorption, and, of these two or more layers, the layer situated on the light-entering side is made to have a rate of moisture absorption higher than that of the layer situated on the light-emerging side on which the diffusion lens array is formed, even when the diffusing sheet dries from the light source side due to heat generated by the cathode ray tubes, it does not curve so as to project toward the light-emerging side. Therefore, the diffusing sheet is prevented from partly coming into contact with the other optical sheet to cause illumination non-uniformity.

BEST MODE FOR CARRYING OUT THE INVENTION

Embodiments of the present invention will be described hereinafter with reference to the accompanying drawings.

Figure 1:
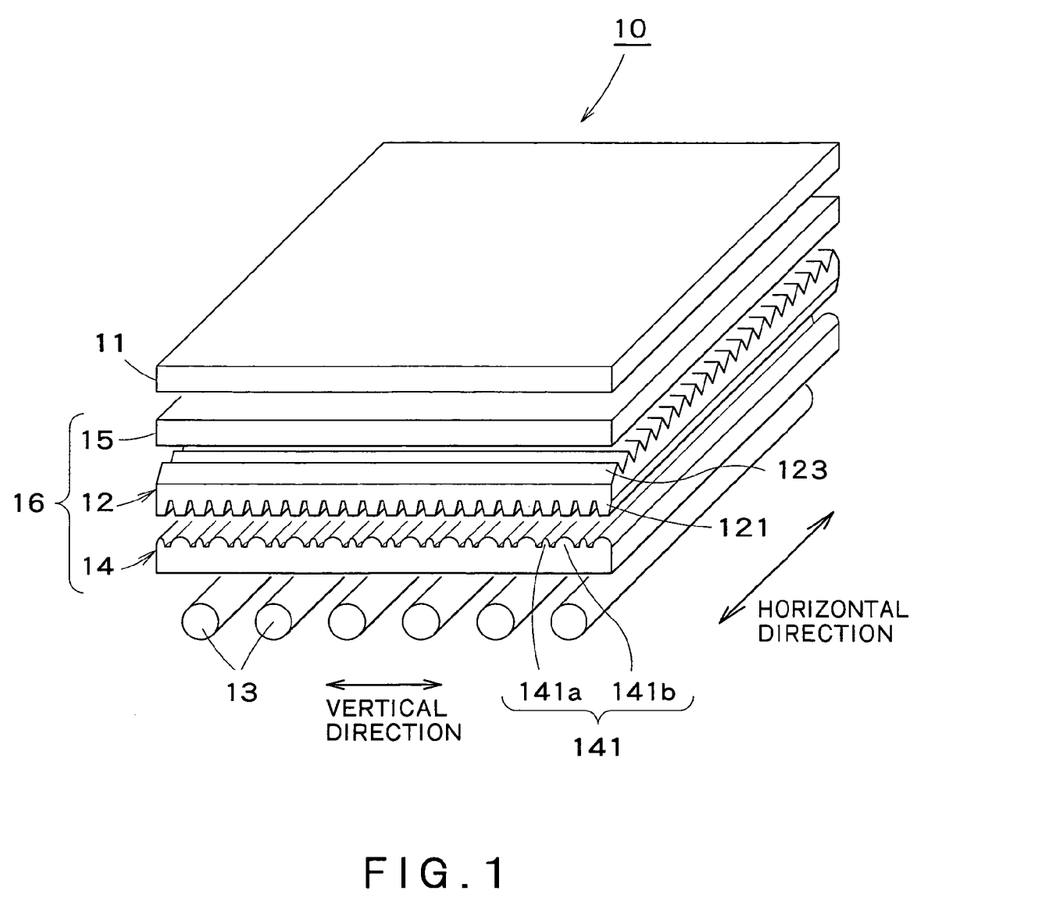
FIG. 1 is a perspective view of a transmission type display in one embodiment according to the present invention.

As shown in FIG. 1, a transmission type display 10 in one embodiment according to the present invention is a liquid crystal display of transmission type, in which liquid crystal display elements control transmission/non-transmission of light to display image information. The transmission type display 10 comprises an LCD panel (transmission type display device) 11, and a surface light source device 16 that illuminates the LCD panel 11 from its rear. The surface light source device 16 includes, at least, a convergent sheet 12, cathode ray tubes 13, a diffusing sheet 14, and a reflective polarization sheet 15. The surface light source device 16 illuminates, from the rear, the LCD panel 11 on which an image pattern has been produced according to image information, thereby forming an image on the LCD panel 11. Those figures, including FIG. 1, to which reference is made in the following description are diagrammatic views, and the dimensions and the shapes of the parts shown in the figures are exaggerated in order to facilitate understanding.

The LCD panel 11 is a light valve composed of liquid crystal display elements of so-called transmission type. In this embodiment of the present invention, the LCD panel 11 is 30 inches in size and is so constructed that it can attain 800 by 600 dot matrix display.

The surface light source device 16 is of direct type in which a plurality of cathode ray tubes 13 are arranged in parallel. The cathode ray tubes 13 are arc tubes of line light sources that constitute a light source unit serving as a backlight. In this embodiment of the present invention, six cathode ray tubes 13 are arranged in parallel and equally spaced about 75 mm apart. In this embodiment of the present invention, as shown in FIG. 1, these cathode ray tubes 13 are so arranged that their longitudinal direction agrees with the horizontal direction of the LCD panel 11, and that the direction in which they are arranged agrees with the vertical direction of the LCD panel 11.

A reflection plate, not shown in the figure, is placed on the rear of the cathode ray tubes 13. The reflection plate so placed makes the luminous intensity of light incident on the screen of the LCD panel 11 nearly uniform.

The diffusing sheet 14 is placed between the cathode ray tubes 13 and the convergent sheet 12. When the diffusing sheet 14 is placed, the luminance on the display screen becomes almost uniform regardless of the position on the display screen (that is, regardless of whether the position is close to the cathode ray tube 13 or to the space between the cathode ray tubes 13 that are arranged in parallel), and light is to reach the convergent sheet 12 under such a state.

It is preferable that the diffusing sheet 14 be placed next to the cathode ray tubes 13 constituting a light source unit so that light from the cathode ray tubes 13 directly enters the diffusing sheet 14. This arrangement of the diffusing sheet 14 makes possible to attain uniform illumination so that the luminance on the display screen becomes uniform regardless of the position on the display screen. At the same time, light can be effectively used to thereby enhance luminance as a whole.

The diffusing sheet 14 to be incorporated in the surface light source device 16 is described below in detail.

Figure 2:
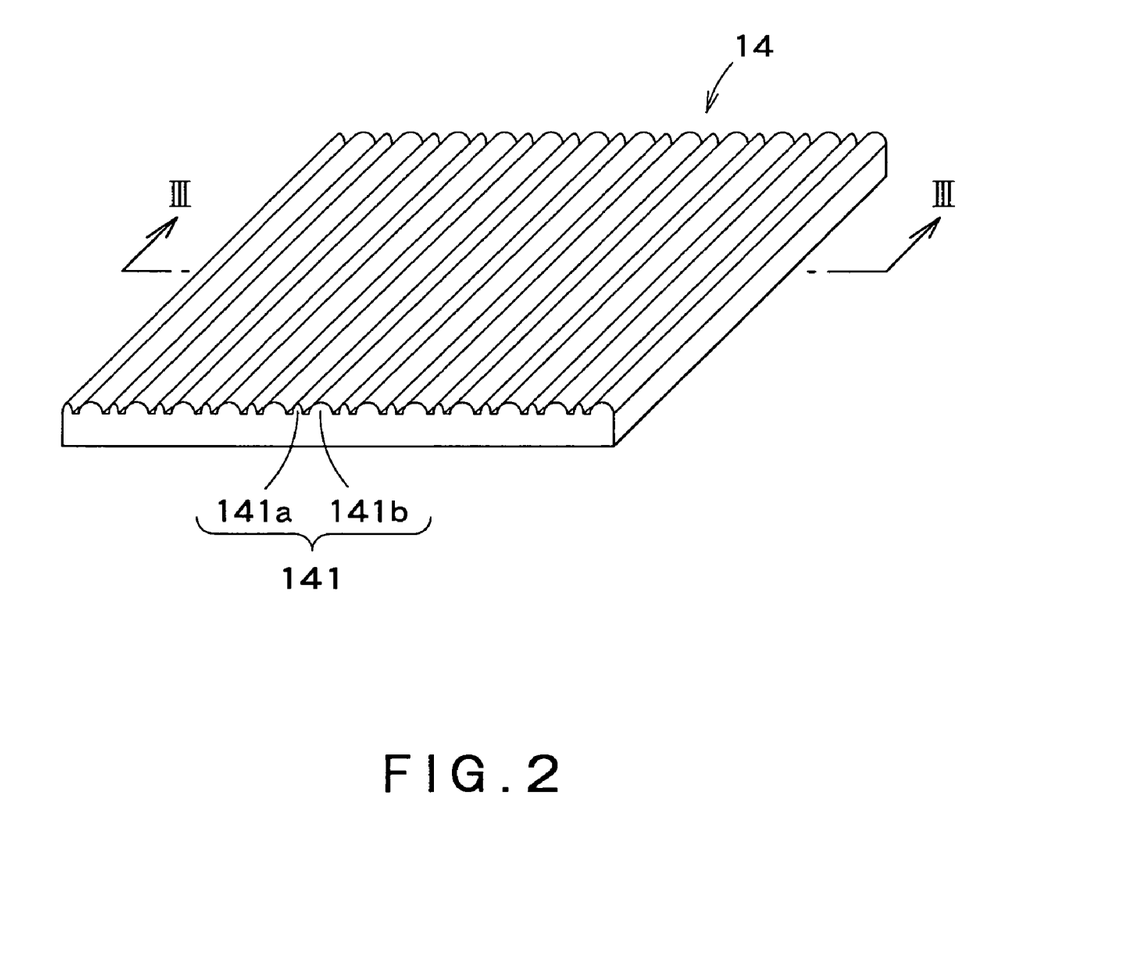
FIG. 2 is a perspective view of a diffusing sheet contained in the surface light source device in the transmission type display shown in FIG. 1.

As shown in FIGS. 1 and 2, the diffusing sheet 14 is a sheet for diffusing light from the cathode ray tubes 13 so as to make the light uniform. The diffusing sheet 14 has a diffusion lens array 141 formed on the light-emerging side surface of the diffusing sheet 14.

The diffusion lens array 141 diffuses light from the cathode ray tubes 13 and allows the diffused light to emerge from the array. This diffusion lens array 141 includes two different unit lenses (two different types of a unit lens) 141a and 141b which are regularly arranged on the sheet face. The shape of each of two unit lenses is equivalent to a part of continuous elliptic cylinders having elliptical cross sections. The unit lenses (the two types of a unit lens) 141a and 141b are different from each other in height. The two different unit lenses 141a and 141b are arranged in parallel, and the direction in which they are arranged agrees with the direction in which the cathode ray tubes 13 are arranged (see FIG. 1).

Figure 3:
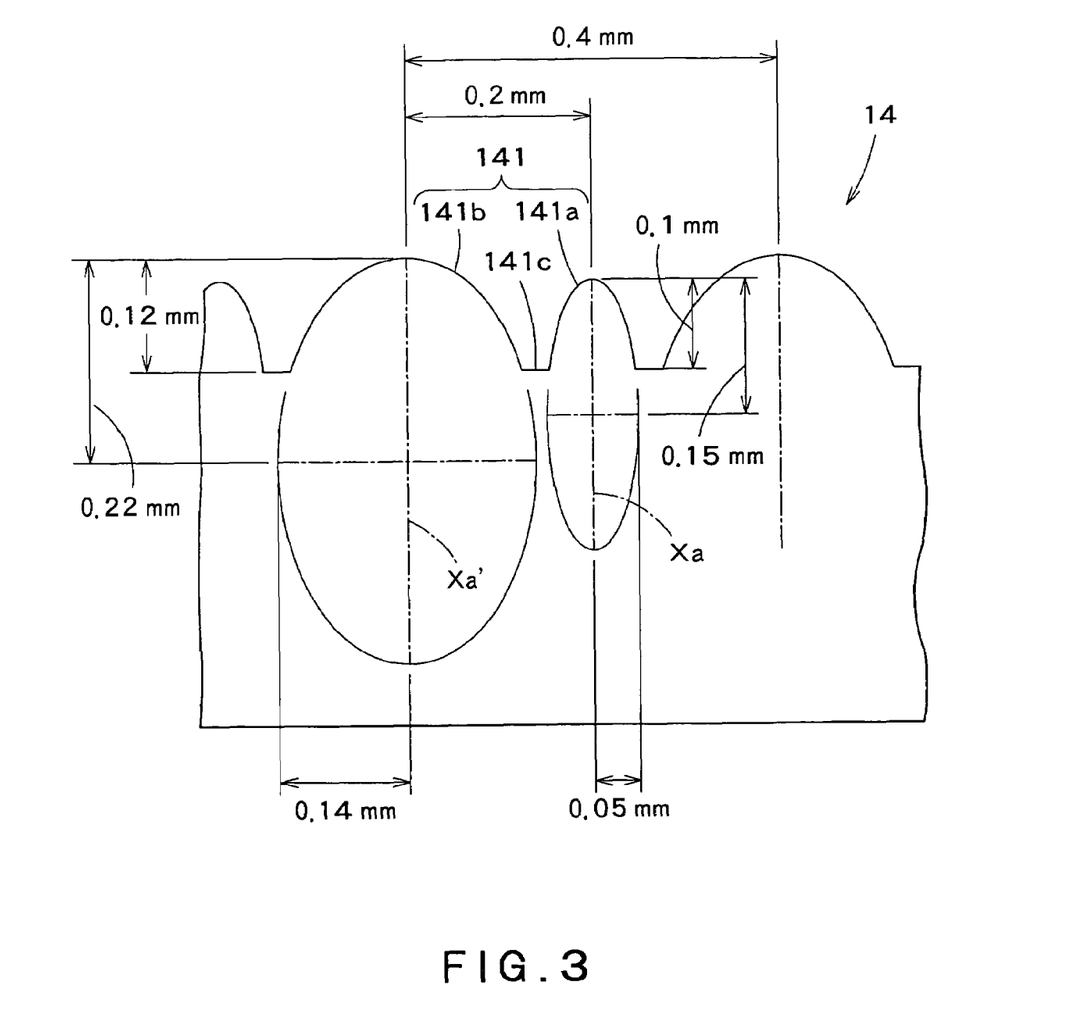
FIG. 3 is an enlarged sectional view of the diffusing sheet, taken along the line III-III of FIG. 2.

As shown in FIG. 3, each of the lower unit lenses (each unit lens with the lower type) 141a in the diffusion lens array 141 has an elliptical cross section. The major axis Xa of the ellipse is perpendicular to the sheet face. As shown in FIG. 3, each of the higher unit lenses (each unit lens with the higher type)

141b has an elliptical cross section. The major axis Xa' of the ellipse is perpendicular to the sheet face. A flat part 141c is formed between the lower unit lens 141a and the higher unit lens 141b. The provision of the flat part 141c can enhance a strength of a mold that is used for manufacturing the diffusion lens array 141 of the diffusing sheet 14, so that deformation of the mold can be prevented.

As illustrated in FIG. 3, in this embodiment of the present invention, the shape of the cross section of each of the lower unit lenses 141a in the diffusion lens array 141 of the diffusing sheet 14 is equivalent to a part of an ellipse with a semi-major axis of 0.15 mm and a semi-minor axis of 0.05 mm (an ellipse whose major axis Xa is perpendicular to the sheet face of the diffusing sheet 14). The projecting portion of the unit lens 141a toward the light-emerging side is 0.1 mm in height (height measured from the flat part 141c). The shape of the cross section of each of the higher unit lenses 141b is equivalent to a part of an ellipse with a semi-major axis of 0.22 mm and a semi-minor axis of 0.14 mm (an ellipse whose major axis Xa' is perpendicular to the sheet face of the diffusing sheet 14). The projecting portion of the unit lens 141b toward the light-emerging side is 0.12 mm in height (height measured from the flat part 141c). The semi-major axis of the ellipse of the lower unit lens 141a is 3 times the semi-minor axis of the same, and the semi-major axis of the ellipse of the higher unit lens 141b is 1.57 times the semi-minor axis of the same.

A distance between the major axis Xa of the lower unit lens 141a and the major axis Xa' of the higher unit lens 141b is 0.2 mm. A combination of two different unit lenses 141a and 141b adjacent to each other (a combination of two different types of a unit lens adjacent to each other) constitutes a unit lens group. The unit lens group is repeatedly arranged on the sheet face with a pitch of 0.4 mm. The diffusing sheet is 2 mm in thickness, and is made of an MS resin (acryl-styrene copolymer) with a refractive index N of 1.55.

Although an optimum width of the flat part 141c varies depending on a pitch of the arranged unit lenses 141a and 141b, it is preferable that the width of the flat part 141c be generally in a range of from about 2 µm to about 50 µm.

Figure 8A:
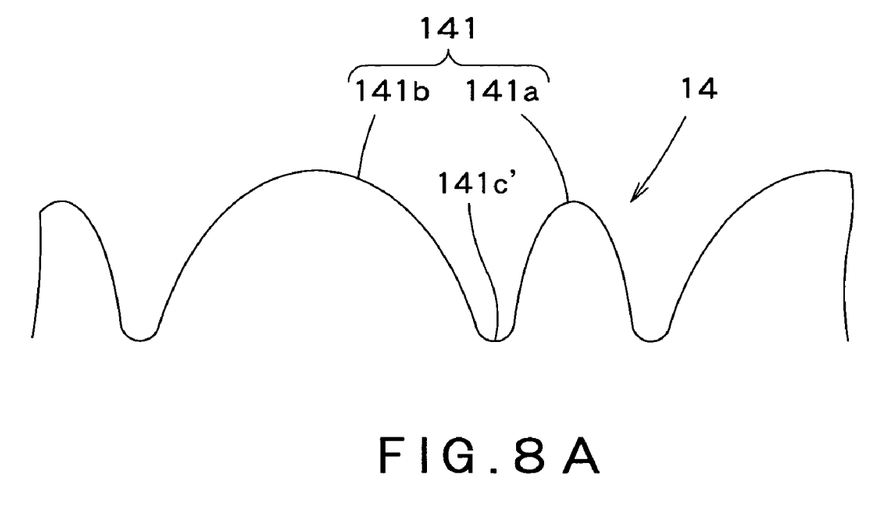
FIGS. 8A and 8B are enlarged sectional views of modifications of the diffusing sheet shown in FIG. 2.
Figure 8B:
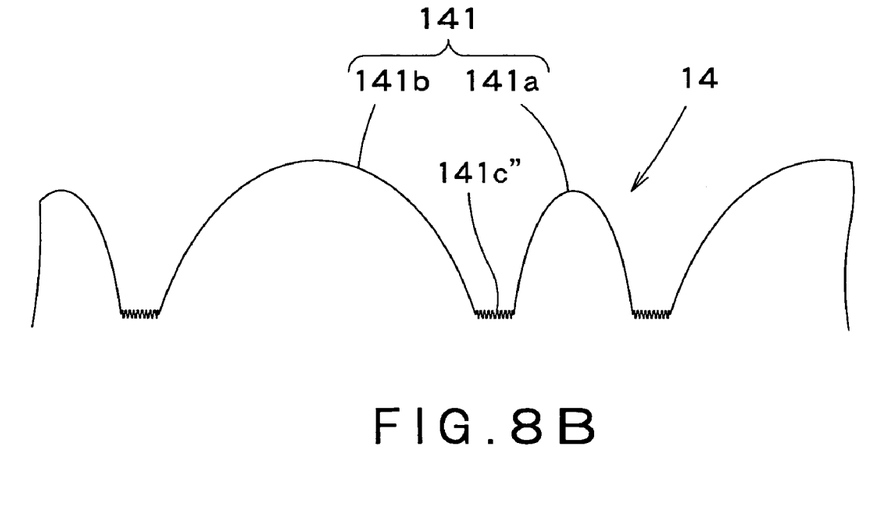

In the description above, the flat part 141c formed between the unit lenses 141a and 141b has been explained by way of example. However, the present invention is not limited to such an example. For example, a concave part 141c' shown in FIG. 8A which is curved so as to project toward the side of the LCD panel 11, and a finely roughened part 141c" shown in FIG. 8B, may be provided. Provision of the concave part 141c' shown in FIG. 8A increases a transmittance for light incident at an angle of approximately 0°, although the diffusing sheet 14 whose emerging surface is formed only of the unit lenses 141a and 141b has an insufficient transmittance for such light. Simultaneously, there can be obtained the effect of properly eliminating illumination non-uniformity and the effect of correcting and converging the direction in which light emerges. That is to say, since the diffusion lens array 141 of the diffusing sheet 14 in this embodiment is designed such that light incident thereon at an angle in a range of from 30° to 50° can be effectively corrected, a transmittance for light incident at an angle of approximately 0° is undesirably lowered, if a surface on the light emerging side of the diffusing sheet 14 is formed only of the unit lenses 141a and 141b. However, as stated above, when the concave part 141c' is provided, the diffusing sheet 14 shows, for light incident at an angle of approximately 0°, the effect of properly eliminating illumination non-uniformity and the effect of correcting and converging the direction in which light emerges.

Next, the optical action of the diffusing sheet 14 of the above-described construction will be described with reference to FIGS. 4, 5A, 5B, and 6.

Figure 4:
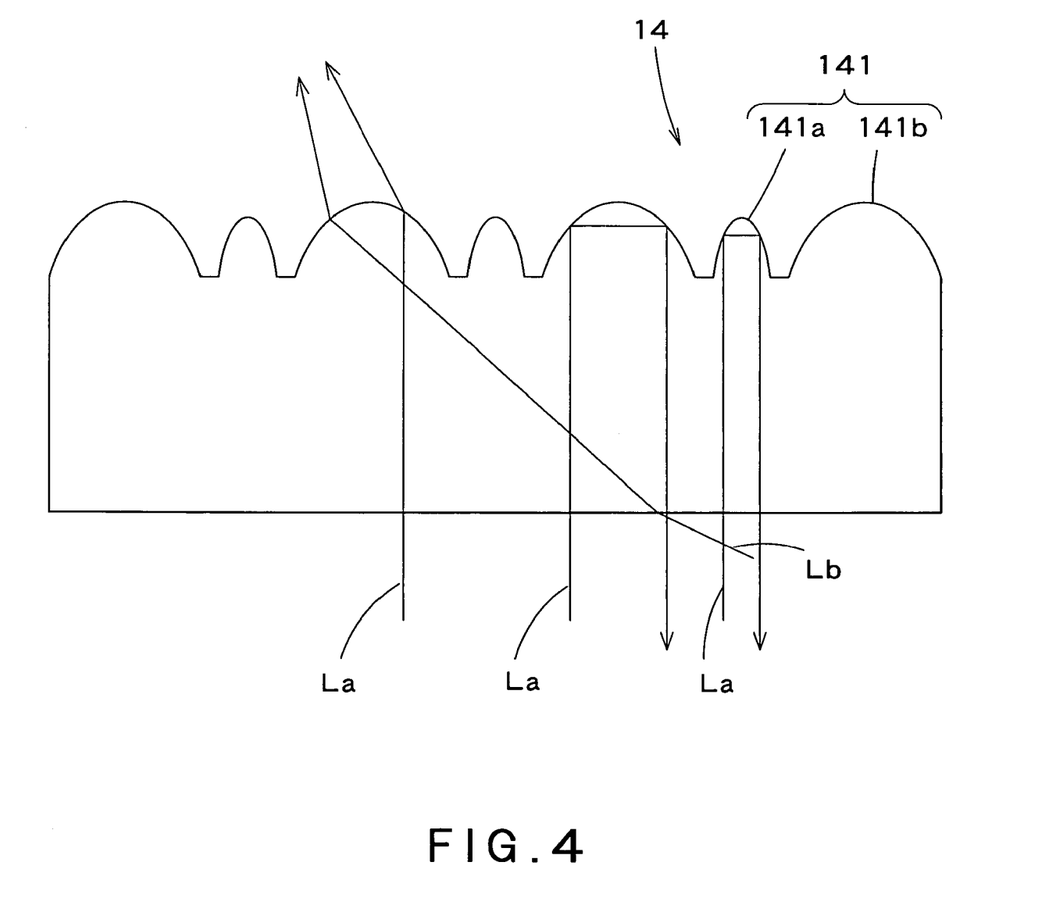
FIG. 4 is a view showing typical paths along which light incident on the diffusing sheet shown in FIG. 2 travels.

FIG. 4 is a view showing typical paths along which light incident on the diffusing sheet 14 travels.

As apparent from FIG. 4, most of the light La that has entered the diffusing sheet 14 at small angles return to the light source side, while most of the light Lb that has entered the diffusing sheet 14 at large angles emerge from the diffusing sheet 14 toward the observation side without returning to the light source side. Since the diffusing sheet 14 has such an optical action, a large proportion of illumination light emerging from the cathode ray tube 13 and entering the diffusing sheet 14 at a point close to the cathode ray tube 13 returns to the cathode ray tubes side, i.e., the light source side, because the angle at which the light has entered the diffusing sheet 14 is small. On the other hand, as the distance between the point on the diffusing sheet 14 at which the illumination light enters the diffusing sheet 14 and the cathode ray tube 13 increases (as the point on which the light is incident comes close to the space between the cathode ray tubes 13 arranged in parallel), the proportion of the light that emerges from the diffusing sheet 14 toward the observation side increases. Therefore, the luminous intensity of the light that finally emerges from the diffusing sheet 14 becomes uniform.

When the unit lenses 141a and 141b in the diffusion lens array 141 provided on the diffusing sheet 14 have the above-described shapes, the higher unit lens 141b has the height H of 0.12 mm and the width W of 0.25 mm. Thus, these values fulfill the following formula (1) when the refractive index N is 1.55:

$$\arcsin(1/N) < \arctan(1/((2H/W)-0.1)) \tag{1}$$

This formula (1) is used for judging whether the light totally reflected on a point (height) situated 10% apart from the edges of the unit lenses 141a and 141b in the diffusion lens array 141 is totally reflected from the top areas of the unit lenses 141a and 141b.

Figure 5A:
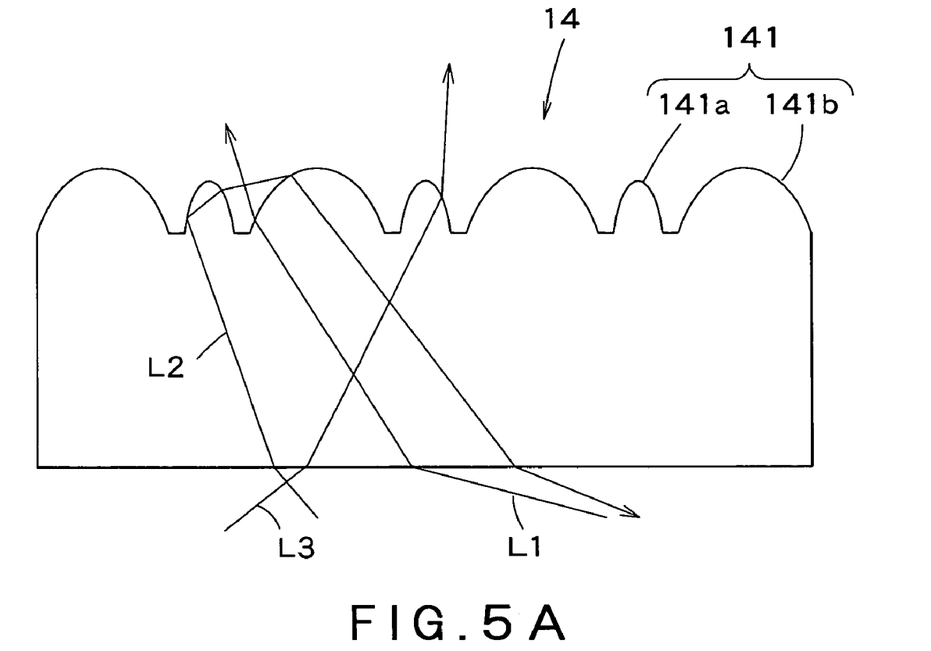
FIG. 5A is a view showing the way of traveling of light in the diffusing sheet shown in FIG. 2.
Figure 5B:
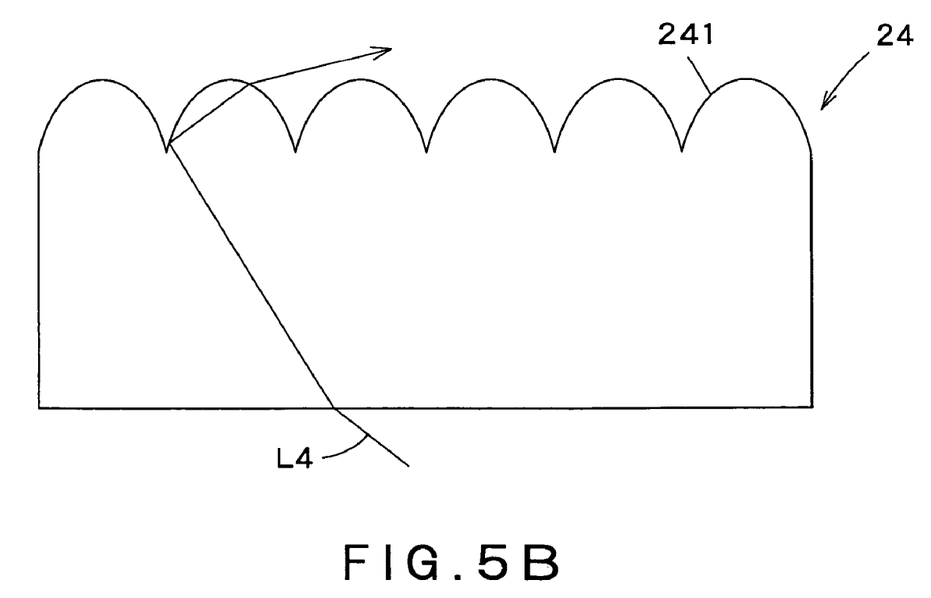
FIG. 5B is a view showing the way of traveling of light in a conventional diffusing sheet.

FIG. 5A is a view showing the way of traveling of light in the diffusing sheet 14. FIG. 5B is a view showing the way of traveling of light in a conventional sheet (diffusing sheet including only unit lenses that do not fulfill the formula (1)).

As shown in FIG. 5B, light reaches the top area of a diffusion lens array 241 in a conventional diffusing sheet 24 from various directions. If light that has entered from a certain direction is totally reflected from a trough area between two unit lenses in the diffusion lens array 241 and emerges from the top area of the unit lens, the light travels obliquely (see, the light ray L4 in FIG. 5B). Thus, when the display screen is observed from oblique directions, the luminance on the display screen appears non-uniform. However, if the formula (1) is fulfilled, light can emerge from the diffusing sheet 14 at a small angle, which is shown by the light ray L1 in FIG. 5A. Therefore, the luminance on the display screen appears uniform, even when the display screen is observed from oblique directions. Moreover, the enhanced optical efficiency can be obtained.

In this embodiment, as stated above, the semi-major axis of the elliptical cross section of the lower unit lens (the type of a unit lens with the smaller height of the two different types of a unit lens) 141a in the diffusion lens array 141 is 3 times the semi-minor axis of the same, while the semi-major axis of the elliptical cross section of the higher unit lens (the type of a unit lens with the greater height of the two different types of a unit lens) 141b is 1.57 times the semi-minor axis of the same. Since the unit lenses 141a and 141b are in such shapes, even when light emerges from the lower unit lens 141a at a large angle, the light strikes the adjacent higher unit lens 141b (see the light ray L2 in FIG. 5A), whereby the light can be prevented from emerging from the diffusing sheet 14 at a large angle.

Herein, it is preferable that the semi-major axis of the elliptical cross section of the lower unit lens 141a be equal to or more than 2.5 times the semi-minor axis of the same, and that the semi-major axis of the elliptical cross section of the higher unit lens 141b be equal to or less than 2.5 times the semi-minor axis of the same. When these conditions are satisfied, it is possible to allow light emerging from the lower unit lens 141a at a large angle to strike the adjacent higher unit lens 141b.

When a ratio of the semi-major axis to the semi-minor axis of the elliptical cross section of each of the unit lenses 141a and 141b is equal to or less than 2.5, no light emerges from said unit lens, after a total reflection of light that has entered said unit lens at an angle of 0°. On the other hand, when the ratio is equal to or more than 2.5, some light emerges from the unit lens at a large angle, after a total reflection of light that has entered said unit lens at an angle of 0°. In this case, illumination non-uniformity occurs when the display screen is observed from directions where the light emerges at a large angle. However, when the ratio is equal to or more than 2.5 with respect to the lower unit lens 141a, the light emerging from the lower unit lens 141a, which might cause non-uniformity, is blocked by the higher unit lens 141b, so that no non-uniformity occur. A large ratio of the semi-major axis to the semi-minor axis of the elliptical cross section of the unit lens is effective in improving convergence of light that has entered at a large angle.

In this embodiment, as stated above, a ratio of the semi-major axis to the semi-minor axis of the elliptical cross section of the lower unit lens 141a is so defined that a shape thereof is elongated for converging light incident thereon at a large angle. Meanwhile, a ratio of the semi-major axis to the semi-minor axis of the elliptical cross section of the higher unit lens 141b is so defined that a shape thereof is not so excessively elongated for preventing illumination non-uniformity.

In this embodiment, when the semi-major axis of the elliptical cross section of the lower unit lens 141a is equal to or more than 10 times the semi-minor axis of the same, the slant describes an almost linear curve, which results in an excessively large variation in luminance. Thus, it is most desirable that the semi-major axis of the elliptical cross section of the lower unit lens 141a be in a range of from 2.5 times to 10 times the semi-minor axis of the same.

In this embodiment, when the semi-major axis of the elliptical cross section of the higher unit lens 141b is equal to or less than once the semi-minor axis of the same, the effect of correcting an optical axis cannot be sufficiently obtained. Thus, it is most desirable that the semi-major axis of the higher unit lens 141b be in a range of from 1 time to 2.5 times the semi-minor axis of the same.

Figure 6:
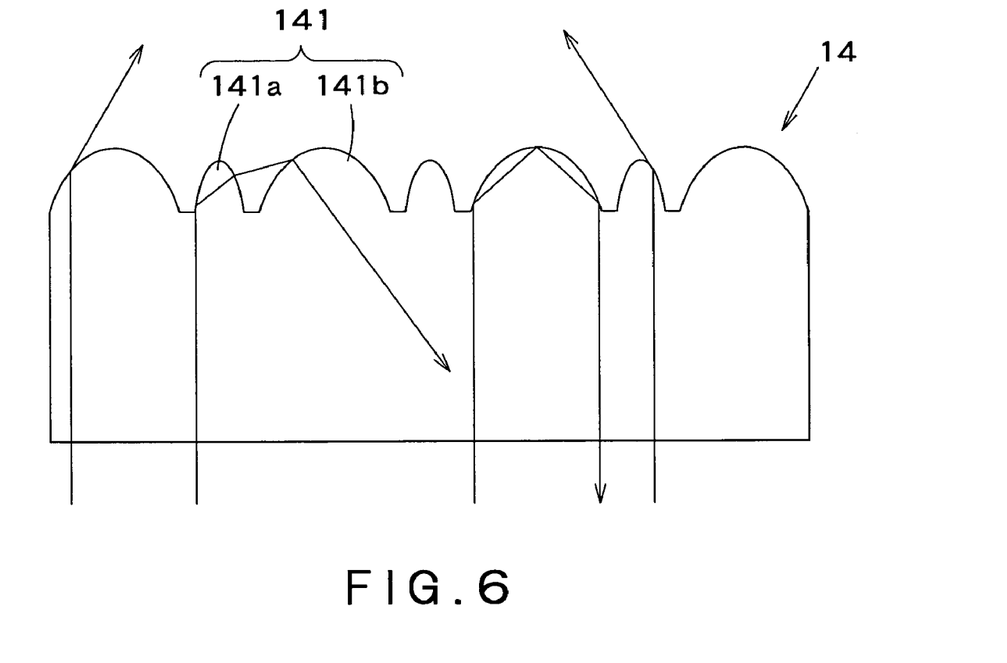
FIG. 6 is a view showing the way of traveling of light incident almost perpendicularly on the diffusing sheet shown in FIG. 2.

FIG. 6 is a view showing the way of traveling of light incident almost perpendicularly on the diffusing sheet 14 in this embodiment.

As clearly seen from FIG. 6, light incident almost perpendicularly on the diffusing sheet 14 is totally reflected from the unit lens 141a in the diffusion lens array 141, and then a part of the light emerges from the unit lens 141a. The light emerging from the unit lens 141a is captured by the adjacent unit lens 141b, and is returned to the light source side, so that it is re-used. Therefore, in this embodiment, since nearly all of the light, that has emerges from the unit lens 141a at a large angle to widely spread, is prevented from emerging from the diffusing sheet 14 but is returned to the light source side, it is possible to effectively draw out focused light. At the same time, it is possible to decrease illumination non-uniformity (tube non-uniformity) which is caused by the arranged cathode ray tubes 13.

Figure 12:
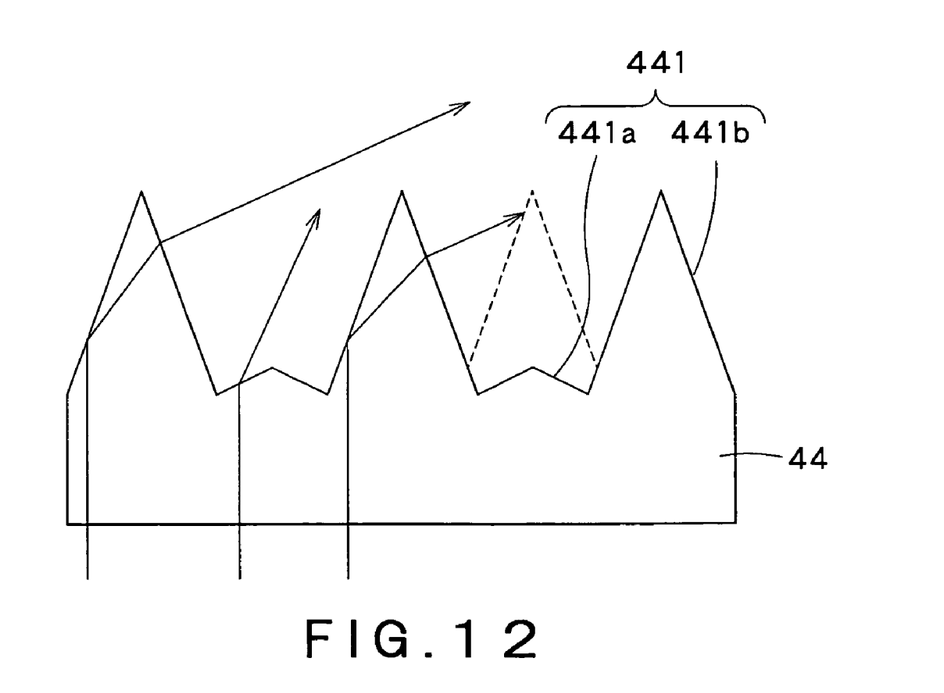
FIG. 12 is a view showing the way of traveling of light in a conventional diffusing sheet.

On the contrary, as shown in FIG. 12, in the optical sheet disclosed in Japanese Patent Laid-Open Publication No. 2002-535690, which was referred to as a conventional art in the section "BACKGROUND ART" hereinbefore, light that has entered a lower unit lens 441a and a higher unit lens 441 in a diffusion lens array 441 is totally reflected from the unit lenses 441a and 441b, and emerges from the optical sheet at large angles. Thus, the light cannot be focused in a direction perpendicular (normal) to the sheet face. In addition, the light incident on the unit lenses 441a and 441b emerges therefrom without being returned to the light source side, so that it is not re-used. As apparent from this, the present invention is absolutely different from the invention disclosed by Japanese Patent Laid-Open Publication No. 2002-535690, in terms of usage of lenses and shapes thereof. Thus, actions and effects of these inventions are absolutely different from each other.

Returning now to FIG. 1, the convergent sheet 12 for use in the surface light source device 16 is described.

Figure 7:
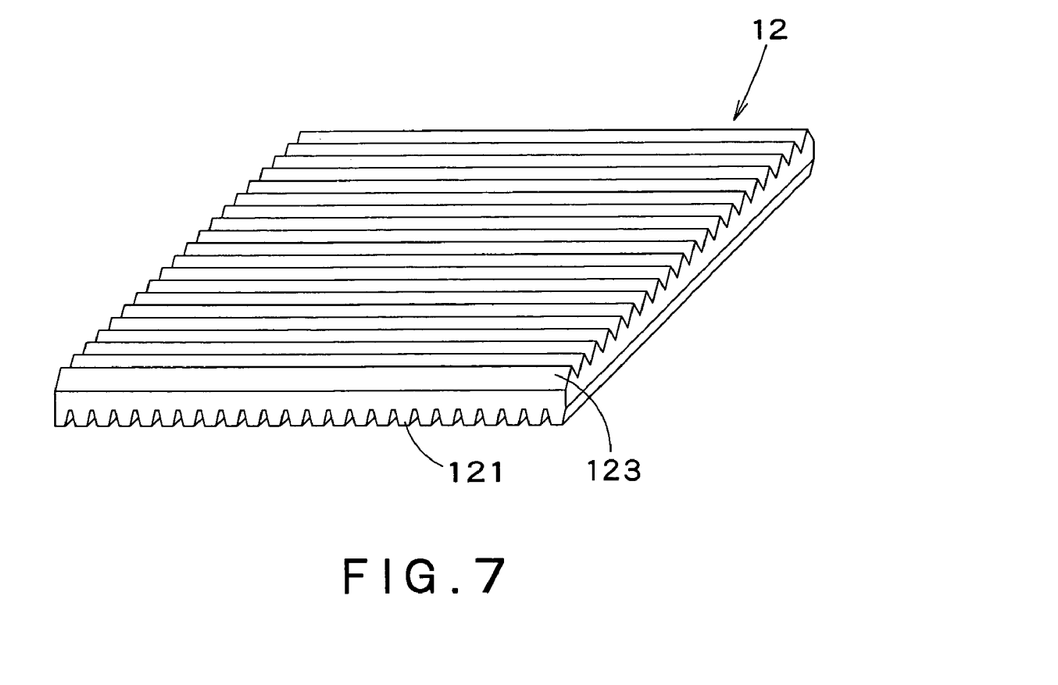
FIG. 7 is a perspective view of a convergent sheet contained in the surface light source device in the transmission type display shown in FIG. 1.

As shown in FIGS. 1 and 7, the convergent sheet 12 is for converging light that has been diffused by the diffusing sheet 14 after emerging from the cathode ray tubes 13, and allowing the converged light to emerge from the sheet. The convergent sheet 12 is placed between the diffusing sheet 14 and the LCD panel 11. In this embodiment, the convergent sheet 12 is formed by the use of a resin with a given refractive index (e.g., n=1.55).

On the light-entering side (the cathode ray tubes 13 side) surface of the convergent sheet 12, a plurality of light-entering side unit lenses 121 whose sections taken in the direction perpendicular to the sheet face are nearly trapezoidal are arranged in the direction of the sheet face. These light-entering-side unit lenses 121 extend in the direction perpendicular to the direction in which they are arranged repeatedly, with their cross sections maintained constant. Namely, the convergent sheet 12 is arranged so that the direction in which the light-entering-side unit lenses 121 extend agrees with the longitudinal direction of the cathode ray tubes 13.

A convergent lens array 123 is formed on the light-emerging side (the LCD panel 11 side) surface of the convergent sheet 12. In the convergent lens array 123, a plurality of unit prisms whose sectional profile taken in the direction perpendicular to the sheet face, and parallel to the direction in which the light-entering-side unit lenses 121 extend, are equilateral triangles are arranged in the direction of the sheet face.

Namely, in the convergent sheet 12, the direction in which the light-entering-side unit lenses 121 provided on the light-entering side extend and the direction in which the unit prisms in the convergent lens array 123 provided on the light-emerging side extend are perpendicular to each other.

In the surface light source device 16 shown in FIG. 1, although the convergent sheet 12 is arranged so that the direction in which the light-entering-side unit lenses 121 extend agrees with the longitudinal direction of the cathode ray tubes 13 and that the direction in which the unit prisms in the convergent lens array 123 extend is perpendicular to the longitudinal direction of the cathode ray tubes 13, the convergent sheet 12 may be turned 90° on the sheet face. That is to say, the convergent sheet 12 may be arranged so that the direction in which the light-entering-side unit lenses 121 extend is perpendicular to the longitudinal direction of the cathode ray tubes 13 and that the direction in which the unit prisms in the convergent lens array 123 extend agrees with the longitudinal direction of the cathode ray tubes 13.

Therefore, the convergent sheet 12 can converge, in directions perpendicular to the cathode ray tubes 13, the illumination light due to the light-entering-side unit prisms 121 provided on the light-entering side, and also converge, in directions parallel to the cathode ray tubes 13, the illumination light due to the convergent lens array 123 provided on the light-emerging side.

The reflective polarization sheet 15 is a sheet capable of increasing luminance without decreasing an angle at which an image can be observed, and is placed between the LCD panel 11 and the convergent sheet 12. For example, DBEF (manufactured by Sumitomo 3M Limited, Japan) may be used as the reflective polarization sheet 15.

Therefore, according to this embodiment, the surface light source device 16 of direct type, in which a plurality of the cathode ray tubes 13 are arranged in parallel, incorporates the diffusing sheet 14 having the diffusion lens array 141 which is disposed at least on a light-emerging side surface of the diffusing sheet 14. The diffusion lens array 141 includes at least two different unit lenses 141*a* and 141*b* that are regularly arranged on the sheet face. Therefore, light incident on the diffusing sheet 14 at any angles can have a plurality of luminance features, so that the light can be diffused in various directions. Since the diffusing sheet 14 can decrease illumination non-uniformity, the diffusing sheet 14 can be used as a general-purpose sheet which is capable of maintaining a constant luminance distribution relative to any angles. As a result, the display screen can be illuminated uniformly regardless of the position from which the screen is observed. Specifically, the two unit lenses 141*a* and 141*b* in the diffusion lens array 141 provided on the diffusing sheet 14 are different from each other in height. Since a unit lens group constituted by arranging the unit lenses 141*a* and 141*b* of different height is repeatedly arranged on the sheet surface, illumination non-uniformity can be effectively decreased, while emergence of light at unnecessarily large angles can be prevented, so that an optical efficiency can be enhanced.

MODIFICATION EXAMPLES

The present invention has been described by way of the above-described embodiment. However, the present invention is not limited thereto, and can include various modifications and alterations of the embodiment.

Figure 9:
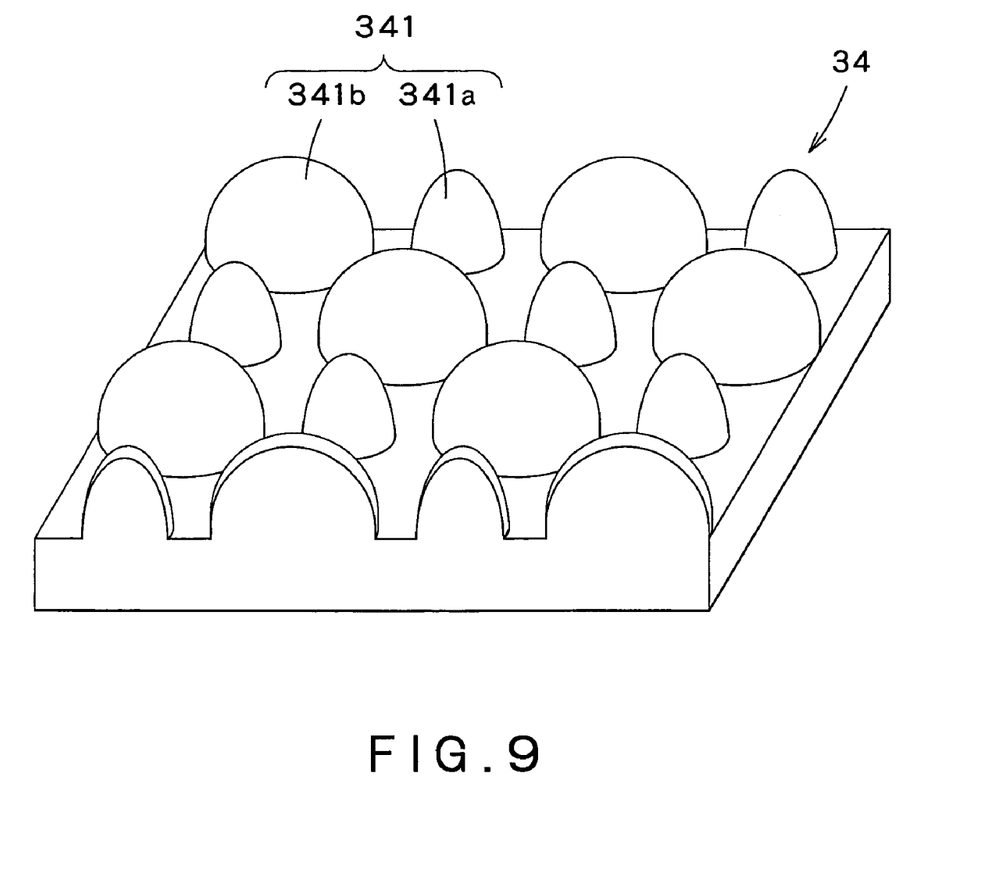
FIG. 9 is a perspective view of another modification of the diffusing sheet shown in FIG. 2.

(1) In the aforementioned embodiment, the unit lenses 141*a* and 141*b* constituting the diffusion lens array 141 on the diffusing sheet 14 are in the shape of a part of continuous elliptic cylinders having elliptical cross sections. However, not limited thereto, in a diffusing sheet 34 shown in FIG. 9, a diffusion lens array 341 may be constituted by two unit lenses (two different types of a unit lens) 341*a* and 341*b* that are in the shape of a part of continuous spheroids having elliptical sections. In this case, it is preferable that the unit lenses 341*a* and 341*b* constituting the diffusion lens array 341 be so formed that the major axes of the elliptical cross sections of the unit lenses 341*a* and 341*b* are perpendicular to the sheet face.

Figure 10:
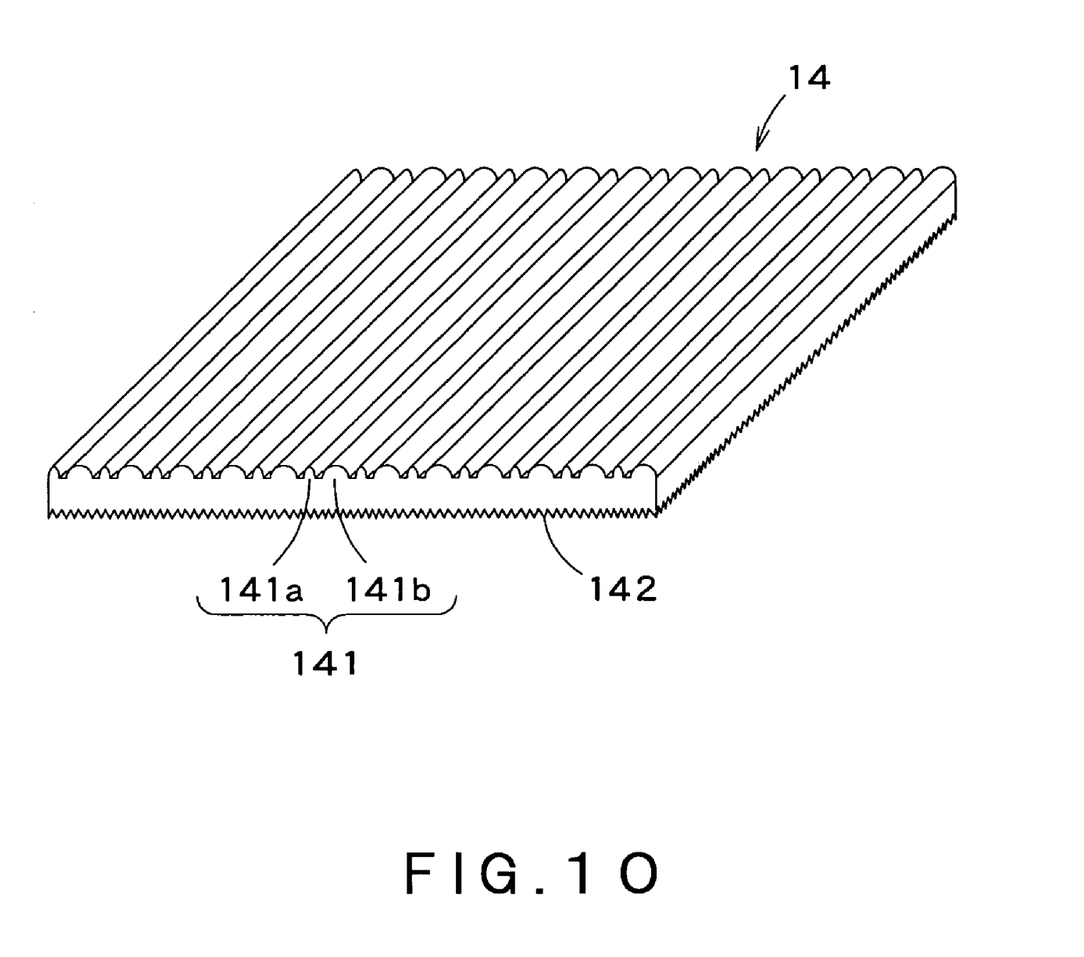
FIG. 10 is a perspective view of another modification of the diffusing sheet shown in FIG. 2.

(2) Although in the above-described embodiment, the light-entering side surface of the diffusing sheet 14 is flat, fine irregularities 142 shown in FIG. 10 may be made on this surface by embossing or the like, so as to enhance the light-diffusing action.

Figure 11:
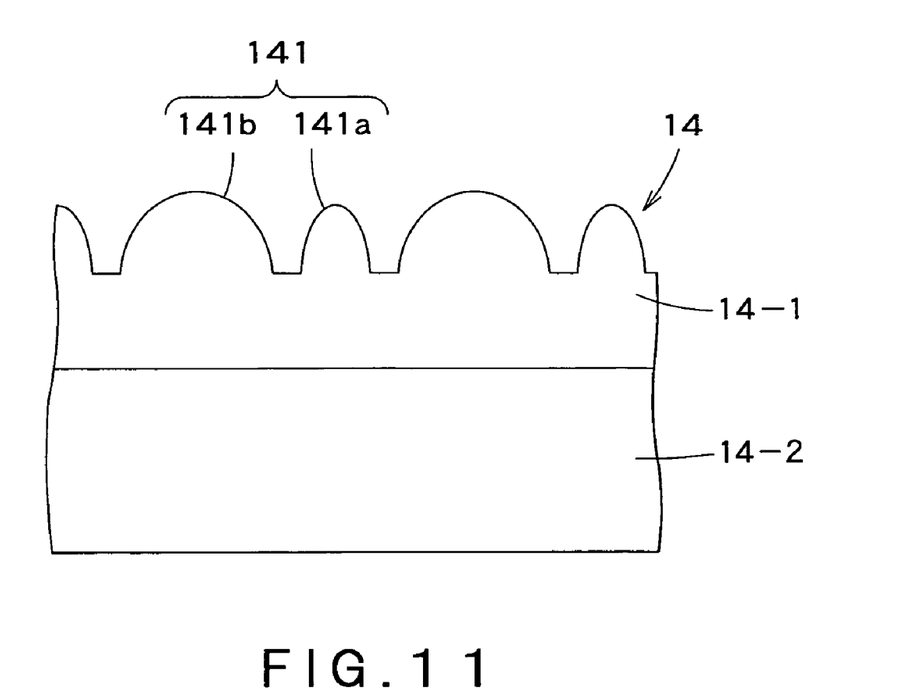
FIG. 11 is an enlarged sectional view of another modification of the diffusing sheet shown in FIG. 2.

(3) The description of the embodiment does not specifically refer to the layer construction of the diffusing sheet 14 and that of the convergent sheet 12. There is a case where these sheets are dried from the cathode ray tubes 13 side due to heat generated by the cathode ray tubes 13 serving as a light source, and are unfavorably bent or warped. To avoid this problem, as exemplarily shown in FIG. 11, the diffusing sheet 14 may be made from two or more layers 14-1 and 14-2 having different rates of moisture absorption. The layers 14-1 and 14-2 are arranged in such a manner that the layer 14-2 situated on the light-entering side has a rate of moisture absorption higher than that of the layer 14-1 situated on the light-emerging side. This constitution allows the diffusing sheet and the converging sheet to be substantially flat upon molding. When these sheets absorb moisture, they curve so as to project toward the light-entering side to become convex. Thus, even when these sheets dry from the cathode ray tubes 13 side due to heat generated by the cathode ray tubes 13, these sheets never curve so as to project toward the light-emerging side to become convex. Besides the above means, a spacer may be provided on the light source side (cathode ray tubes 13 side) in order to solve the problem that the sheets are bent or warped.

(4) The above embodiment has been described with reference to the case where the diffusing sheet 14, the convergent sheet 12, and the reflection polarization sheet 15 are combined to form the surface light source device 16, and to form the transmission type display 10 including the surface light source device 16. The present invention is not limited to this, and, for example, the convergent sheet 12 (and the reflective polarization sheet 15, if necessary) may be omitted. Moreover, a surface light source device, and a transmission type display including the device may be obtained by the combination use of a variety of optical sheets other than the above-described ones and the diffusing sheet 14.

(5) The above embodiment has been described with reference to the case where the diffusion lens array 141 of the diffusing sheet 14 is constituted by arranging the two unit lenses 141*a* and 141*b* of different height (the two types of a unit lens with different height). However, not limited thereto, it is possible to use a diffusion lens array constituted by arranging, i.e., three unit lenses of different height (three types of a unit lens with different height), or more than three unit lenses of different height (three types of a unit lens with different height).

The invention claimed is:

1. A diffusing sheet that is used in a surface light source device of direct type including a light source unit having a plurality of light sources arranged in parallel, and that diffuses light from the light sources in the light source unit to make the light uniform, the diffusing sheet comprising:

at least on its light-emerging side surface, a diffusion lens array having a plurality of unit lenses that allow light from the light sources in the light source unit to be diffused and to emerge from the unit lenses, wherein the diffusion lens array includes at least two different types of a unit lens that are regularly arranged on a sheet face, each of the two types of a unit lens at least is in one shape selected from a shape equivalent to a part of an elliptic cylinder having an elliptical section and a shape equivalent to a part of a spheroid having an elliptical section, and a major axis of the elliptical section of each of the unit lenses is perpendicular to the sheet face.

2. The diffusing sheet according to claim 1, wherein the two types of a unit lens in the diffusion lens array are different from each other in height, and a unit lens group constituted by arranging the two types of a unit lens of different height is repeatedly arranged on the sheet surface.

3. The diffusing sheet according to claim 2, wherein a unit lens with a higher type of the two types of a unit lens in the diffusion lens array has a height H, a width W, and a refractive index N that fulfill the relationship:

$$\arcsin(1/N) < \arctan(1/((2H/W)-0.1)).$$

4. The diffusing sheet according to claim 2, wherein a unit lens with a lower type of the two types of a unit lens in the diffusion lens array has a height $H_2$, a width $W_2$, and a refractive index N that fulfill the relationship:

$$\arcsin(1/N) < \arctan(1/((2H_2/W_2))).$$

5. The diffusing sheet according to claim 2, wherein a shape and a refractive index of each of the two types of a unit lens in the diffusion lens array are defined such that at least a part of light, which light has perpendicularly entered the sheet face so as to directly reach a point on a lens surface of one unit lens with a lowest type of any types of unit lenses, the light is totally reflected on the point so as to reach a next point on the lens surface, and then the light is refracted on the next point so as to emerge from the lowest unit lens, can reach another unit lens with a highest type of any types of unit lenses.

6. The diffusing sheet according to claim 5, wherein a unit lens with a lowest type of the two types of a unit lens has a semi-major axis that is equal to or more than 2.5 times a semi-minor axis of the same.

7. The diffusing sheet according claim 5, wherein a unit lens with a highest type of the two types of a unit lens has a semi-major axis that is equal to or less than 2.5 times a semi-minor axis of the same.

8. The diffusing sheet according to claim 1, wherein between each two adjacent unit lenses in the diffusion lens array is provided a part that is at least in one form selected from flats, concavities, and fine irregularities.

9. The diffusing sheet according to claim 1, wherein the diffusing sheet includes, on a light-entering side, a plane of incidence with fine irregularities having a light-diffusing action.

10. The diffusing sheet according to claim 1, wherein the diffusing sheet comprises two or more layers having different rates of moisture absorption, and a layer situated on a light-entering side has a rate of moisture absorption higher than that of a layer situated on a light-emerging side on which the diffusion lens array is formed.

11. A surface light source device that illuminates a transmission type display device from its rear, comprising:
   a light source unit having a plurality of light sources arranged in parallel; and
   a diffusing sheet according to claim 1, that diffuses light from light sources in the light source unit to make the light uniform.

12. The surface light source device according to claim 11, wherein the diffusing sheet is placed next to the light source unit so that light from the light source unit directly enters the diffusing sheet.

13. A transmission type display comprising:
   a transmission type display device; and
   a surface light source device according to claim 11, that illuminates the transmission type display device from its rear.

* * * * *